United States Patent [19]

Arbeillé et al.

[11] Patent Number: 4,479,908

[45] Date of Patent: Oct. 30, 1984

[54] DEVICE FOR DISPERSING A FLUID IN A JET OF FLUID OF HIGHER DENSITY, PARTICULARLY OF A GAS IN A LIQUID

[75] Inventors: Yves Arbeillé; Jean Lucas, both of Antony, France

[73] Assignee: Centre National du Machinisme Agricole, du Genie Rural, des Eaux et des Forets (CEMAGREF), Antony, France

[21] Appl. No.: 562,515

[22] Filed: Dec. 19, 1983

Related U.S. Application Data

[62] Division of Ser. No. 315,431, Oct. 27, 1981, abandoned.

[51] Int. Cl.³ ............................................. B01F 3/04
[52] U.S. Cl. ........................................ 261/62; 137/542; 261/76; 261/DIG. 75
[58] Field of Search ................. 261/62, 76, 78 A, 116, 261/118, DIG. 75, DIG. 13; 137/625.4, 38, 535, 540, 542; 99/453; 426/474, 511, 522

[56] References Cited

U.S. PATENT DOCUMENTS

| 1,277,963 | 9/1918 | Lovejoy | 261/62 |
|---|---|---|---|
| 1,437,649 | 12/1922 | Guelbaum | 137/625.4 |
| 1,839,952 | 1/1932 | Daily . | |
| 1,853,045 | 4/1932 | Gnau . | |
| 2,300,642 | 11/1942 | Booth | 261/DIG. 75 |
| 2,767,840 | 10/1956 | Dobson et al. . | |
| 3,006,622 | 10/1961 | Shimokawa et al. | 261/79 A |
| 3,600,817 | 8/1971 | Klein | 55/261 X |
| 3,638,925 | 2/1972 | Braemer | 261/62 |
| 4,051,204 | 9/1977 | Muller et al. | 261/DIG. 75 |
| 4,123,238 | 10/1978 | Hegeman | 261/116 X |
| 4,305,894 | 12/1981 | Lindblom | 261/DIG. 75 |

FOREIGN PATENT DOCUMENTS

| 404938 | 9/1934 | Belgium . | |
|---|---|---|---|
| 631458 | 6/1936 | Fed. Rep. of Germany . | |
| 1557169 | 7/1939 | Fed. Rep. of Germany . | |
| 893713 | 10/1953 | Fed. Rep. of Germany | 261/DIG. 75 |
| 1907278 | 8/1970 | Fed. Rep. of Germany . | |
| 2620634 | 11/1977 | Fed. Rep. of Germany . | |
| 2062295 | 1/1971 | France . | |
| 2121064 | 8/1972 | France . | |
| 7905844 | 4/1980 | Netherlands . | |

Primary Examiner—Richard L. Chiesa
Attorney, Agent, or Firm—Young & Thompson

[57] ABSTRACT

A fluid of lower density is dispersed in a jet of a fluid of higher density, by imposing on the jet of higher density a curved trajectory. Where the pressure is the highest, that is, where the wall that establishes the curved trajectory has its largest radius of curvature, the fluid of lower density is introduced, preferably under pressure. The apparatus can be embodied as a tuyere which is a figure of rotation, when only a relatively small proportion of lower density fluid is to be introduced. When the proportion of lower density fluid is greater, however, then the device can be embodied as a duct of quadrangular section wrapped in a helix with narrow slots for the introduction of the fluid of lower density formed in its outer wall.

6 Claims, 4 Drawing Figures

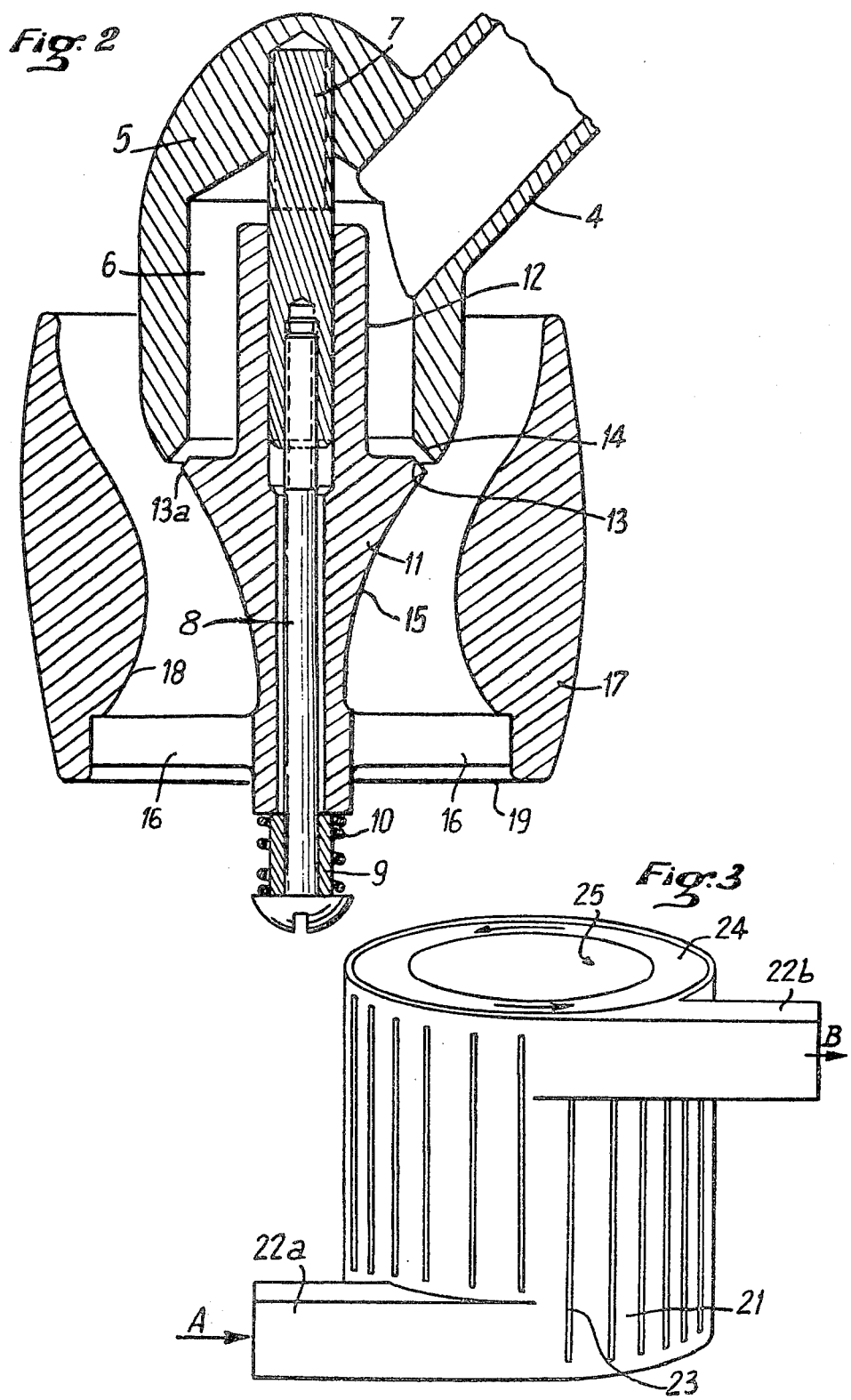

DEVICE FOR DISPERSING A FLUID IN A JET OF FLUID OF HIGHER DENSITY, PARTICULARLY OF A GAS IN A LIQUID

This application is a division of application Ser. No. 315,431, filed 10/27/81 and now abandoned.

The object of the present invention is to provide the homogeneous dispersion of a gas in a liquid in the form of fine bubbles, and more generally the dispersion in a primary fluid of a secondary fluid of much lower density in the form of fine bubbles or droplets.

Hitherto, in order to introduce a gas in a liquid in a state which is divided as much as possible, devices have been used which provide a lamination of one or of the two fluids, an impact effect between the two fluids, a filtration or a mechanical beating of the mixture after its formation.

The disadvantages of such devices are the energy losses resulting from their operation, the complexity of the mechanical devices to be used and their tendency to be quickly clogged up. Moreover, the recoalescence of the bubbles formed is a limitation to the fineness of the mixture.

The object of the present invention is to remedy such disadvantages.

Without wishing to be in no way limited by such a theory, the inventors explain the method of the invention by a rupture phenomenon of the geometrical stability of the interface between two fluids of different densities when the system is subjected to a variation of the acceleration field. Under the effect of forces induced by the acceleration field, the pressure gradients in the vicinity of the interface between the two fluids break the geometrical equilibrium at said interface by inducing a local evolution of the radius of curvature until the corresponding interface capillarity forces reestablish the equilibrium. Where the dispersion of a light fluid in a fluid of higher density is involved, such an evolution is in the direction of a decrease of the radii of curvature of the elements of the light fluid, viz. a decrease of the average volume of said elements. Such a decomposition leading to a fine granulometry is provided by a rupture at the end of a continuous geometrical deformation.

This phenomenon can only take place through a relative displacement of the two fluids, the heavy fluid moving in the direction of the created acceleration field, and the light fluid in the reverse direction. The initial configuration of the two fluids should therefore allow such an evolution without reaching prematurely a new state of equilibrium.

The hereabove physical phenomenon, contrary to the prior methods, does not induce almost intrinsically the recoalescence of the lighter element immediately after the dispersion.

The application of such a dispersion principle to the mixture and the dispersion of great quantities of fluids calls for the use of a continuous method, viz. which is applied locally to a stream of two fluids, said fluids having in said stream a common interface.

The method according to the invention is characterized in that there is imposed on a stream flowing at high speed of two fluids of different densities having an interface, a curved trajectory, said curved trajectory being maintained over a certain length of its path of travel.

In practice, the fluid of higher density is made to circulate in the form of a fluid jet at a high speed, said jet is made to follow a curved trajectory creating in the conduit a pressure gradient, and there is introduced in said fluid jet of high density, through the conduit wall having the greatest radius of curvature, that is where the pressure is highest, the fluid of lower density.

The device for practising the method comprises a channel formed with a curved portion, the introduction port of the light fluid in the rapid stream of the heavy fluid opening into the wall having the greatest radius of curvature of the duct providing the curved trajectory necessary for the phenomenon and upstream of at least one portion of said curved section. Under the effect of the pressure gradient provided by the curved shape of the stream lines, the particles of light fluid have a tendency to move in the direction of the center of curvature, that is toward the opposite wall of the conduit. Thus is obtained a natural dispersion of a light fluid in a heavy fluid in the form of bubbles the diameter of which is a function of the intensity of the acceleration field.

When practising the method according to the invention and where a dispersion of a relatively low percentage of light fluid is involved, a device is used which comprises a tuyere, the median axis of the tuyere passage having a curvature of constant direction at least over a certain distance downstream of the issue, on the tuyere wall having the largest radius, of the inlet duct of the fluid to be dispersed.

In other words, the issue of the inlet duct of the fluid of lower density is situated upstream of the surface of concave curvature of the tuyere on which the pressure resulting from the centrifugal force which is exerted on the fluid of the jet is the highest.

The section of the tuyere transversely to the flow can be rectilinear, curved or of revolution.

According to a further characteristic of the invention which is applicable in particular to the dispersion of a gas in a liquid, the tuyere is a Venturi with axial core the median axis of the passage downstream of the neck of which is concave toward the outside, the gas inlet channel opening on the surface of the axial core substantially at the level of the neck of the Venturi. Due to the depression prevailing at the neck of the Venturi, the injection of a gas in the liquid jet can be provided by the suction effect resulting from such a depression.

According to a preferred embodiment of the above Venturi tuyere with a central core, the issue of the gas inlet channel is formed by a slot at the periphery of the axial core. This embodiment of the gas injection allows, for a same flow rate, reducing the space occupied and providing a stronger lamination, the granulometry of the primary bubbles being thereby finer.

According to a further feature, the slot is formed by the clearance existing between a fixed upstream portion and a mobile downstream portion of the central core, the downstream portion being resiliently urged toward the upstream portion. Thus is obtained an automatic opening and closing device of the gas inlet channel.

Due to its small dimensions, the tuyere according to the invention can be mounted on a helix blade providing the displacement of the fluid medium of high density, generally water and for example a waste water to be aerated, for circulating said fluid through the tuyere, the air being automatically sucked as a function of the flow rate of the tuyere and dispersed in the form of fine bubbles in the liquid.

Where the method is used for introducing important quantities of the light fluid, the jet of fluid which is denser is made to describe a circular trajectory by circulating in a curved duct and the lighter fluid is introduced under pressure through the wall of said duct having the maximum radius.

The duct may be a duct of reduced length made of a simple bend but, in order to provide it with a sufficient longitudinal extension in order to form in the outer wall ports of section sufficient for the introduction of the fixed volume of fluid to be dispersed and of lower density, it can be formed by a duct of quadrangular section, particularly rectangular, wrapped in helix or by a cylindrical enclosure with tangential introduction of the fluid of higher density or by centrifugation of the fluid of higher density flowing through said enclosure by mechanical means. Said mechanical means may be formed by the inner wall of the duct driven positively in rotation about the axis, whereby said wall can be smooth or provided with blades, or by the duct itself which forms then a centrifugal machine with introduction of the fluid of lower density through the peripheral wall of the centrifugal machine.

The introduction of the fluid of lower density is provided preferably via narrow slots parallel to the axis of curvature of the curved duct.

The fluid of lower density can be a gas, a steam or a liquid. In the application which is more specially in consideration for the sterilization of milk by condensation of saturated water steam, the fluid of lower density is a water steam at about 170° C.

Various embodiments of the invention will now be described with reference to the accompanying drawings wherein:

FIG. 2 is a longitudinal sectional view of a tuyere adapted for being mounted on a helix blade in order to aerate, through air dispersion in said liquid, the liquid stirred by said blade;

FIG. 3 is a schematic perspective view of a device for the introduction of a large quantity of a light fluid in a liquid jet.

Figure 1:
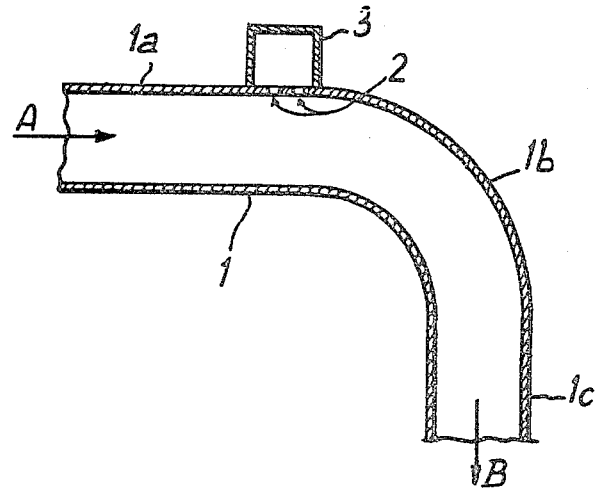
FIG. 1 is a diagram explaining the method of the invention.

As shown in the diagram of FIG. 1, the device for practicing the method comprises a channel (1) for the circulation of the fluid of higher density, for example a liquid which is introduced at A. Said channel is for example of rectangular section and comprises, from upstream to downstream, a rectilinear length (1a), a curved portion (1b) and a rectilinear downstream portion (1c). According to the method of the invention, there is introduced through slots (2) situated immediately upstream of the curved portion (1b) and formed in the wall of the channel which forms the wall of greatest radius of curvature of said curved portion, the lighter fluid, in particular the gas, to be dispersed in the fluid jet of higher density. The gas can be introduced under pressure through the slots (2) by being compressed in chamber (3). The stable dispersion with extremely fine gas bubbles is discharged by the channel at B.

In the embodiment of FIG. 2 (4) designates the air inlet tube, which forms also the fixation member between the helix blade (not shown) and the device according to the invention.

Said tube (4) reaches an ovoidal body (5) in which is formed an opened cylindrical chamber (6) with, in the axis of said chamber, a rod (7) tapped at its free end, its other end being screwed in an axial tapping in the bottom of chamber (6). In the tapping of rod (7) is screwed the threading of a screw (8) on which are threaded a sleeve forming an abutment (9) and a helical spring (10). The sleeve (9) and the helical spring (10) form respectively an end of stroke abutment and a resilient return element for the tuyere as such. Said tuyere is constituted of a central core (11) which is slidably mounted, by its tubular end (12), on rod (7) and which fits via a frustoconical bearing surface (13) surrounding said tubular end (12) onto the frustoconical bearing surface (14) surrounding the opening of chamber (6), said frustoconical bearing surface (13) being prolonged by a concave surface of revolution 15 the generatrix of which is substantially an arc of a circle and the smallest section of which is in the vicinity of the free end of the central core. In the left hand side portion of the figure, there is shown (at 13a) an alternative embodiment according to which the frustoconical portion (13) has a reduced width so that its outer edge is retracted relative to the fluid streams leaving the surface of the ovoidal body (2) at the level of the ridge of the bearing surface (14). In this embodiment, there is formed an interface starting from said ridge and the gaseous flow rate is improved. Opposite the free end of the central core which cooperates with spring (10) and eventually with sleeve (9) are fixed radial fins (16) carrying the nozzle (17) or peripheral sleeve of the tuyere. The other surface of said nozzle is cylindrical and convex whereas its inner surface of revolution (18) has a generatrix such that between said surface and the ovoidal body (5), respectively the central core (11), is provided a passage the section of which decreases substantially up to the level of the ridge of the frustoconical bearing surface (14) and then increases again progressively up to the outlet opening (19).

The tuyere thus realized operates as a Venturi with a depression at the neck at the level of the conical bearing surfaces (14-13) and then a recompression with the establishment of a pressure gradient on the section, the pressure at the contact with surface (15) being higher than at the contact with wall (18) due to the incurvation of the fluid streams. There is produced a longitudinal trailing force on nozzle (17) resulting in a separation of surface (13) from surface (14) with compression of spring (10), the air being sucked by tube (4), chamber (6) and the slot between the bearing surfaces (13) and (14). The air flux thus introduced is subjected to a striction by the fluid streams flowing in a non swirling way at the same time as the greater bubbles move toward wall (18) by being subdivided by the stability rupture phenomenon of the hereabove described interface. Finally, there is obtained a homogeneous and fine dispersion of the air in the liquid flux discharged by outlet (19).

Figure 4:
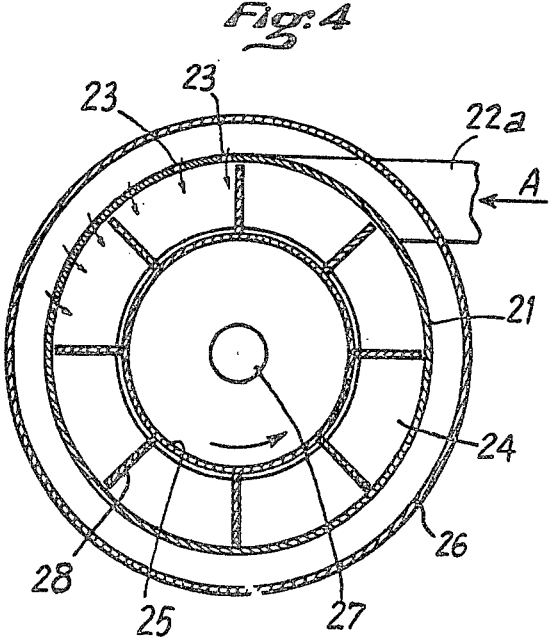
FIG. 4 is a sectional view according to a horizontal plane of FIG. 3 of an alternate embodiment.

The devices shown in FIGS. 3 and 4 are made of a peripheral cylinder (21) at the upper and lower ends of which are connected two ducts of rectangular section (22a) and (22b). Said ducts (22a) and (22b) open tangentially to the wall of cylinder (21) and are oriented in opposite directions so that the fluid introduced at A by duct (22a) assumes, when in contact with the wall, an upward helical movement and exits at B through duct (22b). Narrow slots (23), parallel to the axis of cylinder (21) are formed in the wall of said cylinder (only some of them being shown in FIG. 4). The cylinder ends are closed by walls (24) which may be complete or annular. When they are annular, an inner cylindrical wall (25) can be foreseen, but said wall is not indispensable, the liquid introduced at A flowing by being forced against wall (21) and exiting at B. A peripheral sleeve (26) is provided outside wall (21) for forming with said wall a pressure chamber. Said peripheral sleeve (26) can be of any shape. Said peripheral chamber is connected to a feeding source of fluid under pressure and of lower density to be dispersed in the liquid introduced at A. This chamber can be thermally insulated and eventually include thermal exchange means for superheating the steam when the fluid of lower density is an superheated steam.

In the alternative embodiment of FIG. 4, the wall (25) is adapted for being driven in rotation by a shaft (27) and its peripheral wall is provided with radial blades (28) so that the device maintains the centrifugation movement of the heavier fluid and of the dispersion.

By way of example of a milk sterilizing apparatus by condensation of water steam, the cylinder (21) has a diameter of about 40 millimeters and a height of 80 millimeters, the ducts (22a and 22b) having a section of about 50 square millimeters and the slots (23), which are about twenty five in number, a width of 0.3 mm. The milk is introduced at the speed of 5 to 10 meters per second, preferably 7 meters/second, viz. a flow rate of 0.35 liter per second. The saturated steam is at a temperature of 170° C. under a pressure of about 8 bars. The pressure in the milk conduit is slightly less than the pressure of the steam so as to allow the introduction of said steam.

The steam which penetrates via slots (23) with a flow rate of about 25 liters per second is dispersed in the form of very fine bubbles which condense very rapidly by flowing through the mass of milk under the effect of the centrifugation.

During its helical path of travel, the temperature of the milk increases therefore very rapidly and in a homogeneous way, thereby providing an efficient sterilization.

The invention is also adaptable to many other applications comprising the dispersion of gases in liquids.

We claim:

1. A device for dispersing a fluid of lower density in a jet of fluid of higher density, comprising a body, a central core slidably mounted on the body, a nozzle mounted on and surrounding the core and defining between the nozzle on the one hand, and the body and the core on the other hand, an annular passageway for movement of the fluid of higher density first between the body and the nozzle and then between the core and the nozzle, the body and the core defining between them an annular gap, resilient means acting between the body and the core to urge the core and nozzle toward the body in a direction to decrease the width of said annular gap, and means to supply said fluid of lower density to the interior of the body for flow through the body and through the gap and into the space surrounded by the nozzle and for causing relative movement of said device and said fluid of higher density such that said fluid of higher density flows through said annular passageway relative to said device in a direction opposite to the first-mentioned direction, whereby the width of the gap is proportional to the relative speed between said device and said fluid of higher density.

2. A device as claimed in claim 1, said annular passageway having a least cross-sectional area adjacent said gap and progressively increasing in cross-sectional area in said opposite direction.

3. A device as claimed in claim 2, in which said annular passageway progressively narrows up to said gap in said opposite direction.

4. A device as claimed in claim 2, in which said body has a convex ovoidal outer configuration and said core has a concave configuration which is of greatest diameter at said gap and least diameter in a direction away from said gap.

5. A device as claimed in claim 4, in which the inner surface of said nozzle has a concave configuration opposite said body and a convex configuration opposite said core.

6. A device as claimed in claim 1, and a shaft coaxial with said annular passageway, on which said core is slidably mounted, said resilient means comprising a coil compression spring surrounding said shaft and acting between said shaft and the end of said core remote from said body.

* * * * *